A. P. LANE.
VALVE STEM PACKING.
APPLICATION FILED SEPT. 20, 1910.
991,329.
Patented May 2, 1911.
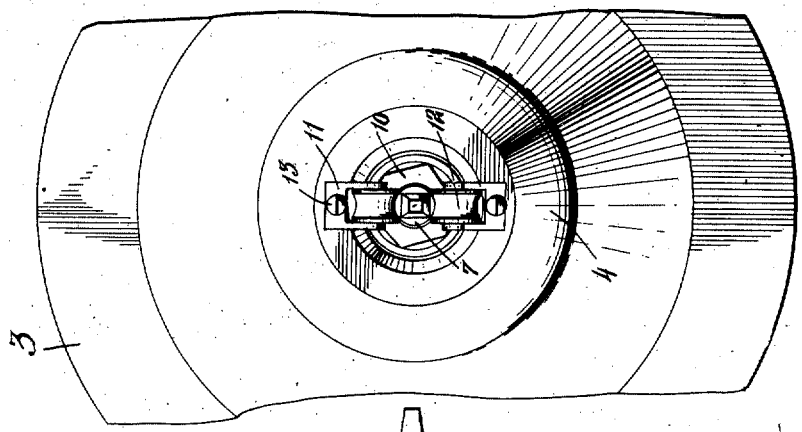
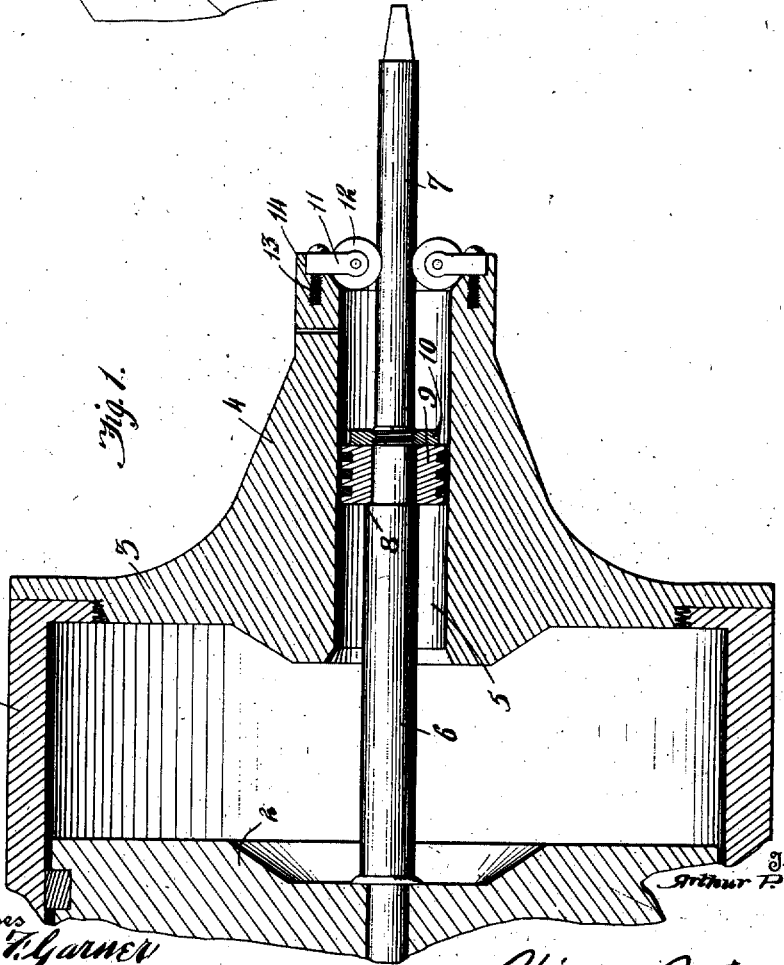

UNITED STATES PATENT OFFICE.

ARTHUR P. LANE, OF DENVER, COLORADO.

VALVE-STEM PACKING.

991,329.  Specification of Letters Patent.  Patented May 2, 1911.

Application filed September 20, 1910. Serial No. 582,884.

*To all whom it may concern:*

Be it known that I, ARTHUR P. LANE, a citizen of the United States, residing at Denver, in the county of Denver and State of Colorado, have invented new and useful Improvements in Valve-Stem Packing, of which the following is a specification.

The present invention is designed primarily to provide a peculiar packing between a stem or rod and the gland or like part in which the same is mounted to reciprocate so as to insure a tight joint to prevent lateral play and to obviate excessive wear.

With the aforementioned objects in view, and such other advantages as may result from the novel construction and arrangement of the parts, the invention consists of the peculiar structural features which hereinafter will be more particularly set forth and which are illustrated in the accompanying drawing, in which:—

Figure 1 is a central longitudinal section of the head of a cylinder or valve chest provided with a packing embodying the invention. Fig. 2 is an end view of the parts shown in Fig. 1.

Referring to the drawing the numeral 1 designates a valve chest or cylinder in which a valve or piston 2 is arranged to operate. The end of the chest or cylinder is closed by means of a head 3, which is provided with a gland 4 of greater length than ordinarily employed, said gland having an opening 5 of larger bore than usual to receive the stem or rod 6 of the valve or piston. The outer portion of the stem 6 is reduced, as indicated at 7, a shoulder 8 being formed at the base of the reduced portion. The opening 5 of the gland 4 is considerably larger than the diameter of the stem 6 and is of uniform size throughout its length. A packing head 9 is mounted upon the inner portion of the reduced part 7 of the valve stem and is confined thereon between the shoulder 8 and a nut 10, which is secured to the stem in any desired way. The inner end of the reduced part 7 of the valve stem is enlarged a trifle to receive the packing head 9 and the nut 10. The packing head 9 is formed in its outer surface with a series of grooves in which packing of any kind is fitted to insure a tight joint between said packing head and the inner walls of the bore or opening 5.

In order to brace the outer portion of the stem 7 guides are interposed between the outer end of the gland 4 and the reduced part of the valve stem. These guides consist of brackets 11 and rollers 12, the latter being grooved to conform to the diameter of the reduced part 7 of the valve stem. Each of the brackets 11 is of substantially U-form and the roller therefor is mounted upon a pin, which is supported at its ends in the side members of the bracket. Machine screws 13 serve to connect the brackets to the outer end of the gland 4. The brackets 11 are fitted into recesses 14 formed in the outer end of the gland.

When the parts are assembled it will be observed that the stem or rod 6 is supported within the gland 4 at two points, the one corresponding with the packing head 9 and the other with the guides, thereby sustaining the stem against lateral stress and preventing any lateral play which would tend to provide a space between the stem and gland to permit escape of the motive medium or other fluid to be confined.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the embodiment thereof, I desire to have it understood that the device shown is merely illustrative, and that such changes may be made when desired as are within the scope of the claims appended hereto.

Having thus described the invention what is claimed as new, is:—

1. In combination with a valve stem or rod, a gland having the opening of larger diameter than said stem to receive the latter, means interposed between the stem and the walls of the opening of the gland to insure a tight joint, and guide means between the stem and gland and secured to the latter and comprising guide rollers to bear laterally against said stem.

2. In combination a gland, a valve stem or rod mounted to reciprocate within said gland, brackets secured to the outer end of the gland, and grooved rollers mounted in the brackets and obtaining a bearing against the sides of the said stem.

In testimony whereof I affix my signature in presence of two witnesses.

ARTHUR P. LANE.

Witnesses:
FRANK A. KRAUSE,
J. A. ROSS.